United States Patent [19]

Witte

[11] 3,878,584

[45] Apr. 22, 1975

[54] HANDLE SECURING MEANS

[75] Inventor: Günter Witte, Attendorn, Germany

[73] Assignee: Gebr. Dingerkus, Attendorn, Germany

[22] Filed: June 21, 1974

[21] Appl. No.: 481,782

[52] U.S. Cl. ............................ 16/110 A; 220/94 R
[51] Int. Cl.... A47b 95/02; B65d 25/28; A47j 45/10
[58] Field of Search.......... 16/128 R, 135, 139, 140, 16/110 R, 110 A, 110.5, 114 R, 114 A, 116 R; 220/94 R, 94 A; 222/323, 324, 441, 44, 465; 224/45 R, 50, 45 F, 45 C; 248/145.6

[56] References Cited
UNITED STATES PATENTS
2,537,362  1/1951  Mattoon ............................ 16/110 A
3,648,887  3/1972  Hantley ............................. 16/116 R

*Primary Examiner*—Geo. V. Larkin
*Attorney, Agent, or Firm*—Spencer & Kaye

[57] ABSTRACT

A securing device for a handle inserted on a carrier bar affixed to an article wall, has a leaf spring which is disposed in an insert opening of the handle. The spring includes, at the one end, a first engaging portion forming a barb that contacts the carrier bar and, at the other end, a second engaging portion constituting an elbow, the peak of which contacts the carrier bar. The elbow has an external free leg which engages an oblique face which is part of the handle and which extends from the insert opening towards the article wall. The spring is releasably held in the insert opening by an externally accessible attaching device.

4 Claims, 3 Drawing Figures

HANDLE SECURING MEANS

BACKGROUND OF THE INVENTION

This invention relates to a handle securing means, particularly for a handle attached to the wall of an article, such as a cooking utensil. The handle is inserted on a polygonal carrying bar affixed to the utensil wall and extending away therefrom. The handle, when in place, hides the carrier bar and is blocked by means of a spring which is disposed in an insert opening of the handle. The spring is of longitudinal configuration and extends in the direction of insertion of the carrier bar. The spring has a first engaging portion which contacts the carrier bar in a barb-like manner and a second engaging portion which is adjacent the utensil wall and which is angularly bent to form an elbow. The free external leg part of the elbow extends obliquely outwardly in the direction of the utensil wall.

According to a known securing arrangement of the above-noted type, the spring is substantially hook-shaped and is held by its own tension between the utensil wall and an angularly extending web portion thereof. The spring has a slightly arcuate portion, a shoulder portion bent approximately perpendicularly to the arcuate portion, a hook-shaped portion extending from the shoulder portion and a nose portion which extends from the shoulder portion and which determines the distance of the shoulder from the utensil wall. At the front of the insert opening of the handle, there is arranged a seat member in such a manner that it is capable of projecting between the shoulder of the spring and the wall of a kitchen utensil, such as a pot. Such an arrangement is disclosed in Austrian Pat. No. 222,283.

The above-discussed known arrangement has the disadvantage that, because of the necessary manufacturing tolerances, a play-free securing of the spring is not possible in the plane extending transversely to the direction of spring bias. For this reason, the insert opening of the handle is subsequently filled with putty or similar hardening material. This type of securing is capable of transmitting only relatively small forces so that it is not adapted for stem-like handles where the static torques are larger than in case of ear or yoke-like handles.

Further, German Utility Model No. 1,880,423 discloses a handle securing device which has the following disadvantages: when the handle is inserted on the carrier, with the spring disposed in the insert opening of the handle, there occurs, by virtue of the friction between the carrier part and the engaging portions of the spring, a relative shift of the spring with respect to the handle in a direction opposite to that in which the handle is inserted. Thus, the spring is, during insertion of the handle onto the carrier, pushed inwardly further into the handle opening from its outer terminal position. When subsequently the inserting step is terminated because the end of the handle abuts against the utensil wall, the spring, upon insertion, is pushed back into its original forward terminal position by the hook-like engaging, tensioned spring portions in contact with the carrier. Upon this occurrence, the engaging spring portions are partially relaxed so that, upon termination of the inserting step, the spring tension of the engaging spring portions is substantially smaller than during the inserting step.

SUMMARY OF THE INVENTION

It is an object of the invention to provide, for a handle, particularly a stem-like handle, an improved securing means of the above-noted type which permits a much greater load than heretofore possible without necessitating additional measures or means and resulting in a play-free immobilization of the handle in which rough tolerances in the dimensioning of the carrier bar and/or the insert opening of the handle may be equalized.

This object and others to become apparent as the specification progresses are accomplished by the invention, according to which, briefly stated, a securing device for a handle inserted on a carrier bar affixed to an article wall, has a leaf spring which is disposed in an insert opening of the handle. The spring includes at the one end, a first engaging portion forming a barb that contacts the carrier bar and, at the other end, a second engaging portion constituting an elbow, the peak of which contacts the carrier bar. The elbow has an external free leg which engages an oblique face which is part of the handle and which extends obliquely from the insert opening towards the article wall. The spring is releasably held in the insert opening by an externally accessible attaching device.

By virtue of the above-outlined measures, all manufacturing tolerances are compensated for so that the handle lies, without a play, against the utensil wall and is maintained in this position in a robust manner that has not been possible heretofore. Further, the mounting of the handle is very simple since all that has to be done is to push the handle onto the carrier bar extending from the utensil without any subsequent operational steps that have been necessary heretofore.

It is a further advantage of the invention that, by using a locking spring, the securing means may be loosened, for example, for replacing the handle. It is to be understood that a permanent immobilization according to the invention is also possible.

DESCRIPTION OF THE PREFERRED EMBODIMENT

Figure 1:
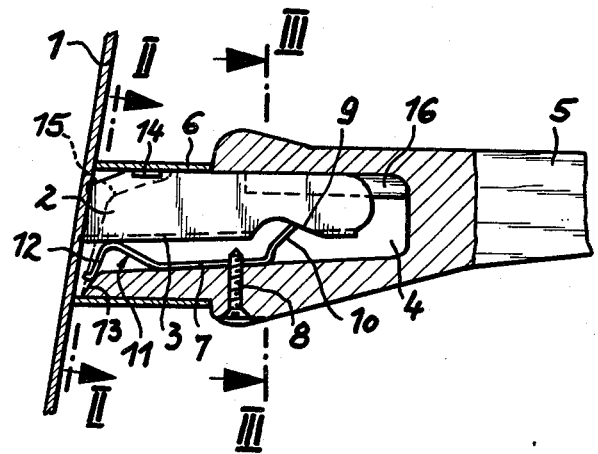
FIG. 1 is a longitudinal sectional view of a preferred embodiment of the invention.

Turning now to FIG. 1, to a utensil wall 1 there is affixed a carrier bar 2, for example, by means of resistance welding. The carrier bar 2 has a channel or U-shaped configuration in section and is arranged with the web 3 of the U oriented downwardly, and thus the side walls of the U (channel) point upwardly. On the carrier bar 2 there is inserted a handle 5 which, for this purpose, has an insert opening 4 and which is of stem-type made preferably of an insulating material. The handle 5 is further provided with a metallic sleeve 6 which is oriented towards the utensil wall and which is non-rotatably affixed to the handle 5.

In the insert opening 4 there is disposed a leaf-spring 7 which has a rectangular section along its entire length and which is attached to the inside wall of the insert opening 4 by means of an externally accessible screw 8. The head of the screw 8 is preferably flush with the outer surface of the handle 5.

The leaf-spring 7 has, at one end, a first engaging portion constituted by a bent leg 10 which hooks in a barb-like manner into an oblique wall portion 9 of the carrier bar 2 and extends approximately normal to the wall portion 9 and is supported thereby. At its forward end, the leaf-spring 7 has a second engaging portion 11 constituted of parts bent approximately rectangularly with respect to one another to form an elbow. The engaging portion 11 is arranged in such a manner that the peak of the elbow engages, with its outer face, urged by the spring 7, the web 3 of the carrier bar 2, while the free outer leg 12 of the elbow, terminating in a bent part, engages, with an inner face, on oblique terminal wall portion 13 forming part of the handle 5. The wall portion 13 extends from the outer edge of the insert opening 4 towards the utensil wall 1.

Figure 2:
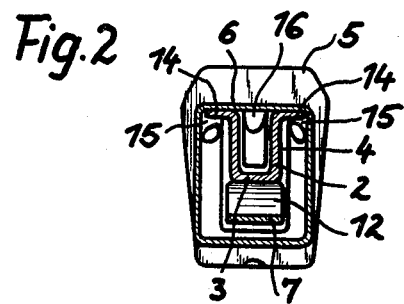
FIG. 2 is a sectional view taken along line II—II of FIG. 1.
Figure 3:
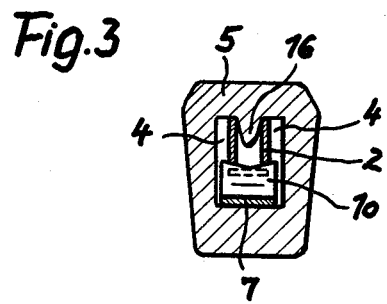
FIG. 3 is a sectional view taken along line III—III of FIG. 1.

Turning now to FIGS. 2 and 3, at the free upper edge of each side wall of the U-shaped carrier bar 2 there is affixed, in the vicinity of the utensil wall 1, a laterally outwardly extending tab 14. Each tab 14, urged by the spring 7, engages with its upper face, the inner, upper wall surface of the handle sleeve 6. The lateral walls of the insert opening 4 are provided with apertures 15 for receiving the tabs 14. In the insert opening 4 there is further provided a wedge 16 which extends between the side walls of the U-shaped carrier bar 2 and expands these side walls until the tabs 14 engage the lateral walls of the sleeve 6 in a play-free manner. It is thus seen that the spring 7 causes the tabs 14 to contact, in a play-free manner, both the upper and the lateral inner wall faces of the sleeve 6. The tabs 14 also ensure in a reliable manner that the handle 5 cannot turn on the carrier bar 2.

It will be understood that the above description of the present invention is susceptible to various modifications, changes and adaptations, and the same are intended to be comprehended within the meaning and range of equivalents of the appended claims.

I claim:

1. In a securing means for a handle mounted on the wall on an article, the securing means being of the type that includes a carrier bar affixed to and extending away from the article wall; means defining an insert opening in the handle for receiving the carrier bar; an elongated blocking leaf spring extending within the insert opening in the direction of insertion of the handle onto the carrier bar, the spring having a first engaging portion at one spring end for contacting the carrier bar in a barb-like manner, the spring further having a second engaging portion at another spring end oriented towards the article wall, the second engaging portion being formed of angularly bent parts constituting an elbow having a free external leg extending outwardly and towards the article wall; the improvement comprising a. an elbow peak forming part of said elbow and having an outer face in engagement with said carrier bar;
   b. an oblique surface forming part of said handle and extending from said insert opening towards said article wall;
   c. an inner face forming part of said free external leg of said elbow and being in engagement with said oblique surface of said handle; and
   d. externally accessible means for releasably affixing said leaf spring to said handle.

2. A securing means as defined in claim 1, wherein said carrier bar has a cross section in the shape of an open channel having side walls, further comprising a wedge member affixed to said handle and disposed in said insert opening, said wedge member being urged into the channel shaped carrier bar by said leaf spring for spreading apart said side walls.

3. A securing means as defined in claim 2, further comprising tabs attached to a free edge zone of each side wall of said carrier bar, said tabs extending laterally outwardly from said carrier bar and having upper faces urged into contact with said handle within said insert opening by said spring.

4. A securing means as defined in claim 1, further comprising a sleeve member affixed to said handle and constituting a continuation of at least one part of said means defining said insert opening, said sleeve member being disposed between said handle and said article wall.

* * * * *